(12) United States Patent
Kelly et al.

(10) Patent No.: US 12,291,386 B2
(45) Date of Patent: May 6, 2025

(54) LINERS FOR BULK CONTAINERS

(71) Applicant: AMCOR FLEXIBLES NORTH AMERICA, INC., Neenah, WI (US)

(72) Inventors: Scott J. Kelly, Kimberly, WI (US); David A. Busche, Neenah, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 662 days.

(21) Appl. No.: 17/279,085

(22) PCT Filed: Sep. 25, 2018

(86) PCT No.: PCT/US2018/052666
§ 371 (c)(1),
(2) Date: Mar. 23, 2021

(87) PCT Pub. No.: WO2020/068053
PCT Pub. Date: Apr. 2, 2020

(65) Prior Publication Data
US 2021/0387786 A1    Dec. 16, 2021

(51) Int. Cl.
*B65D 77/06* (2006.01)
*B32B 27/08* (2006.01)
*B32B 27/32* (2006.01)
*B65D 88/16* (2006.01)

(52) U.S. Cl.
CPC ............ *B65D 77/062* (2013.01); *B32B 27/08* (2013.01); *B32B 27/32* (2013.01); *B65D 88/1618* (2013.01); *B32B 2250/246* (2013.01); *B32B 2270/00* (2013.01); *B32B 2307/412* (2013.01); *B32B 2307/552* (2013.01); *B32B 2307/7244* (2013.01); *B32B 2307/748* (2013.01); *B32B 2439/46* (2013.01)

(58) Field of Classification Search
CPC ... B32B 27/08; B32B 27/32; B32B 2250/246; B32B 2270/00; B32B 2307/412; B32B 2307/552; B32B 2307/7244; B32B 2307/748; B32B 2439/46
See application file for complete search history.

(56) References Cited

U.S. PATENT DOCUMENTS

| | | |
|---|---|---|
| 3,204,825 A | 9/1965 | Underwood |
| 3,565,750 A | 2/1971 | Evans |
| 6,465,107 B1 | 10/2002 | Kelly |
| 2007/0031690 A1 | 2/2007 | Busche et al. |
| 2007/0101061 A1 | 5/2007 | Baskaran et al. |
| 2007/0177273 A1 | 8/2007 | Benson et al. |
| 2008/0280086 A1 | 11/2008 | Sheridan et al. |

(Continued)

FOREIGN PATENT DOCUMENTS

WO    2015094325 A1    6/2015

OTHER PUBLICATIONS

Mitsui Chemicals, Inc., "Development of Silicon-based Surface Modifier EXFOLA", Feb. 25, 2013, Tokyo (Year: 213).*

*Primary Examiner* — Michael C Miggins (57) ABSTRACT

Described are liners for bulk containers that are abuse resistant. The liners include at least one sidewall. The sidewall includes at least an exterior ply and an interior ply. Optionally, the sidewall may include at least one intermediate ply. One of the plies includes a first polyolefin-silicone copolymer. The adhesion between the plies is from 0 g/2.54 cm to 50 g/2.54 cm (0 g/in to 50 g/in).

16 Claims, 4 Drawing Sheets

(56) References Cited

U.S. PATENT DOCUMENTS

| | | | |
|---|---|---|---|
| 2011/0017611 A1* | 1/2011 | Menozzi | C08K 3/22 |
| | | | 205/763 |
| 2012/0199512 A1 | 8/2012 | Plunkett et al. | |
| 2012/0288220 A1 | 11/2012 | Gerhard et al. | |
| 2016/0060476 A1 | 3/2016 | Chen et al. | |
| 2017/0021970 A1 | 1/2017 | Witthuhn et al. | |
| 2017/0361583 A1 | 12/2017 | Brosch et al. | |

* cited by examiner

LINERS FOR BULK CONTAINERS

TECHNICAL FIELD

This present disclosure relates to liners for bulk containers such as bag-in-box containers, drums and rigid, intermediate bulk containers (IBC) that are especially abuse resistant, i.e., resistant to flex-cracking. The liners include a polyolefin-silicone copolymer and may further include a first linear low density polyethylene.

BACKGROUND

Industrial packaging of products in bulk containers, such as bag-in-box formats, drums or IBCs, includes, but is not limited to, such items as liquefied vegetables, condiments, wine, milk, fruit juice, pharmaceutical liquids, oil (food oils, such as vegetable oil, or industrial, such as motor oil), syrups, and even products in granular or powder form. Liners used with bulk containers are subjected to many stresses. For example, liners may have smaller volumes that include 4 liters (1 gallon), larger volumes, such as 208 liters (55 gallons), or even volumes as great as or greater than 1,136 liters (300 gallons). The weight of the products in the liner at these volumes can fatigue the liner materials. Transportation of the filled liners may cause further damage to the liner. In situations where the liner contains liquid products, the liner is susceptible to flex-cracking at the shore line (where the liquid meets the liner at the gas interface). The shore line constantly changes during shipment due to movement and/or vibrations that cause the liquid to move about or slosh. The constant sloshing motion in the shore line area further fatigues the liner material such that flex-cracking can occur, which contributes to liner leakage.

One attempt to reduce flex-cracking has included the use of dunnage when transporting liners in drums or IBCs. Dunnage is packing material that is placed between the liner and the top of the container. Dunnage causes the liner to fit tightly in the container such that flex-cracking and leakage of the liner at the shore line may be reduced. However, the use of dunnage is disadvantageous due to the additional cost of the dunnage material and the cost of extra labor needed to place the dunnage material in the container.

There is an on-going need to provide bulk container liners that provide excellent flex-crack resistance without the use of dunnage.

SUMMARY

The present application describes a liner for a bulk container that can provide improved flex-crack resistance and the liner includes a polyolefin-silicone copolymer.

In one embodiment, the liner includes at least one sidewall. The sidewall includes at least an exterior ply and an interior ply. Optionally, the sidewall may include at least one intermediate ply. One of the plies includes a first polyolefin-silicone copolymer. The adhesion between the plies is from 0 g/2.54 cm to 50 g/2.54 cm (0 g/in to 50 g/in).

Other features that may be used individually or in combination with respect to the embodiment are as follows.

The liner may include the first polyolefin-silicone copolymer in the exterior ply.

The liner may include the first polyolefin-silicone copolymer in the at least one optional intermediate ply.

The liner may include the first polyolefin-silicone copolymer is included in the interior ply.

The liner may include a fitment attached to the at least one sidewall.

The ply of the liner that includes the first polyolefin-silicone copolymer may include the first polyolefin-silicone copolymer in an amount from 0.1 percent to 10.0 percent by weight of the ply that includes the first polyolefin-silicone copolymer.

The ply of the liner that includes the first polyolefin-silicone copolymer may also include a first polyethylene. The first polyethylene may be low density polyethylene, linear low density polyethylene, very low density polyethylene, ultra-low density polyethylene, medium density polyethylene, high density polyethylene, metallocene linear low density polyethylene or blends thereof.

The liner may further include an oxygen scavenger in the exterior ply, the interior ply or the at least one optional intermediate ply.

The exterior ply, the interior ply or the at least one optional intermediate ply of the liner may be monolayered.

The exterior ply, the interior ply or the at least one optional intermediate ply of the liner may be multilayered.

The exterior ply, the interior ply or the at least one optional intermediate ply of the liner may be produced by coextrusion.

The exterior ply, the interior ply or the at least one optional intermediate ply comprise a laminated film.

The exterior ply, the interior ply or the at least one optional intermediate ply of the liner may include at least one layer of the multilayered film that includes an oxygen barrier that may be ethylene vinyl alcohol copolymer or polyamide.

The liner may have a flex crack failure time of greater than 125 minutes.

The exterior ply, the interior ply or the at least one optional intermediate ply of the liner may include a first linear low density polyethylene. The liner may have a flex crack failure time of greater than 144 minutes.

The liner may have a coefficient of friction between any of the plies that is less than 0.2.

In another embodiment, the liner may include a first sidewall that includes at least an exterior ply and an interior ply and a second sidewall that includes at least an exterior ply and an interior ply. The first sidewall may optionally include at least one first sidewall intermediate ply that is positioned between the first sidewall exterior ply and the Interior ply. The second sidewall may optionally include at least one second sidewall intermediate ply that is positioned between the second sidewall exterior ply and the interior ply. The first sidewall exterior ply, the interior ply or the at least one optional intermediate ply comprise a first polyolefin-silicone copolymer. The second sidewall exterior ply, the interior ply or the at least one optional intermediate comprise a second polyolefin-silicone copolymer. The adhesion between the plies of each the first sidewall and the second sidewall is from 0 g/2.54 cm to 50 g/2.54 cm (0 g/in to 50 g/in).

The liner may further include a fitment attached to the first sidewall or the second sidewall.

The first sidewall exterior ply or at least one optional intermediate ply of the first sidewall that may include the first polyolefin-silicone copolymer, and the second sidewall exterior ply or the at least one optional intermediate ply of the second sidewall that may include the second polyolefin-silicone copolymer, may include the first or second polyolefin-silicone copolymer in an amount of 0.1 percent to 10.0 percent by weight of each of the respective plies that includes the first polyolefin-silicone copolymer or the second polyolefin-silicone copolymer.

The ply that includes the first polyolefin-silicone copolymer may include a first polyethylene that includes a linear low density polyethylene or metallocene linear low density polyethylene or blends thereof. The ply that includes the second polyolefin-silicone copolymer may include a second polyethylene that includes linear low density polyethylene or metallocene linear low density polyethylene or blends thereof.

At least the first sidewall exterior ply, the interior ply or the at least one optional intermediate ply and at least the second sidewall exterior ply, the interior ply or the at least one optional intermediate ply may be multilayered coextruded films and at least one ply of each sidewall includes at least one layer that includes an oxygen barrier that includes ethylene vinyl alcohol copolymer or polyamide.

The exterior ply, interior ply or the at least one optional intermediate ply of the first sidewall may include a first linear low density polyethylene. The exterior ply, interior ply or the at least one optional intermediate ply of the second sidewall may include a second linear low density polyethylene.

The liner may include a flex crack failure time of at least 125 minutes.

The liner may be transparent.

BRIEF DESCRIPTION OF THE DRAWINGS

Other objects and advantages of the present disclosure will become more apparent to those skilled in the art in view of the following description and the accompanying figures.

The figures show some but not all embodiments. The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

A liner for bulk containers is described herein. The liner includes at least one sidewall that includes at least an exterior ply and an interior ply. Optionally, the liner may include at least one intermediate ply. At least one of the plies includes a first polyolefin-silicone copolymer. The adhesion between any of the plies of the sidewall, that is, the exterior ply, the interior ply, and the optional intermediate ply, may be from 0 g/2.54 cm to 50 g/2.54 cm (0 g/in to 50 g/in). The liner can be placed in a bulk container.

The term "sidewall", as used herein, refers to at least two discrete plies of polymer film that are sealed to itself or another sidewall to form a bag.

The term "ply", as used herein, refers to a building block of sidewalls of a liner that may be supplied as a polymer film.

The term "exterior ply", as used herein, refers to the portion of the liner that is exposed to the outside environment and is the ply that is furthest away from the product that is packaged in the liner. The exterior ply is in contact with an internal surface of a bulk container during use.

The term "interior ply", as used herein, refers to the portion of the liner that forms an interior surface of the enclosed liner and directly contacts product that is packaged in the liner.

The term "polymer", as used herein, refers to the product of a polymerization reaction, and is inclusive of homopolymers, copolymers, terpolymers, etc. In general, the layers of a film can consist essentially of a single polymer, or can have still additional polymers together therewith, i.e., blended therewith.

The term "layer", as used herein, refers to a structure of a single polymer-type or a blend of polymers that may be accompanied by additives.

The liner sidewalls may be configured as needed to fit into the desired bulk container. For example, the liner can be a pillow bag having seals around four edges of the plies of the sidewalls. The seal may be formed by any known method including adhesive, heat sealing, ultrasonic sealing, RF welding, etc. Further, an exemplary bag may have inner dimensions of about 205 cm (81 inches) wide by about 216 cm (85 inches) long.

The liner may also include a fitment. A "fitment" is a structure that provides an inlet/outlet for product-filling and/or product-dispensing from the liner. One or more fitments may be affixed through a sidewall for filling and dispensing from the liners. The fitment may be any structure suitable for sealing the liquid within the liner, for example a threaded tube may be affixed through a sidewall and a cap threads onto the tube for closure.

Figure 1:
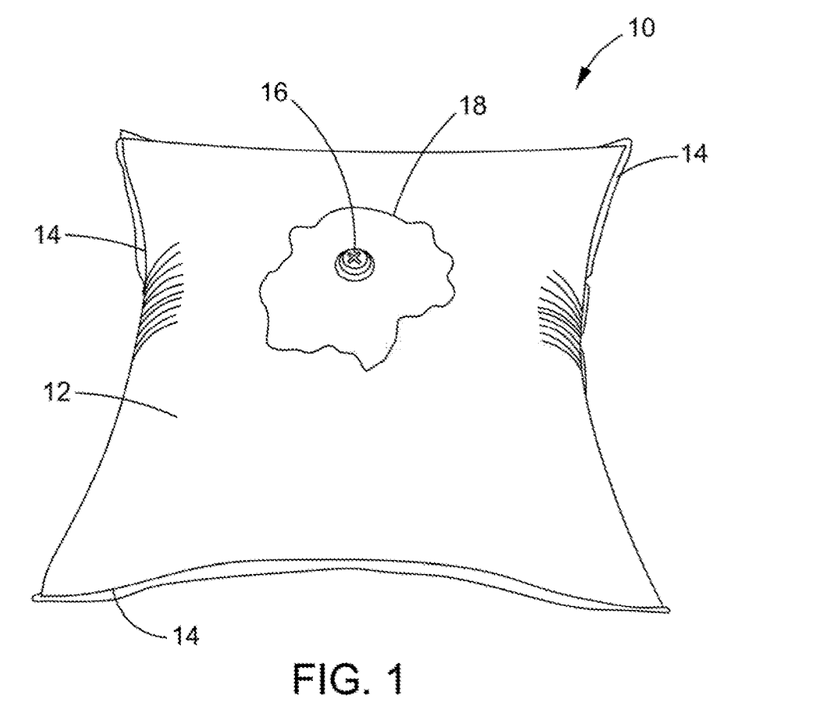
FIG. 1 illustrates a schematic top view of a liner for a bulk container.

FIG. 1 illustrates a schematic top view of a liner 10 for a bulk container that is in accordance with the embodiments described herein. The liner 10 includes a sidewall 12 that has seams 14 to seal the sidewall 12 to another sidewall (not shown). Fitment 16 is attached to the sidewall 12. The liner is filled with liquid product and includes a shore line 18.

The liner 10 sidewall 12 exterior ply, interior ply, and the at least one optional intermediate ply may be each be a monolayer or multilayer film. That is, each ply may be a film that is a single layer or a film that may include several layers. If the exterior ply, the interior ply, or the at least one optional intermediate ply are multilayer films, the ply may include as many layers as necessary to arrive at the desired thickness, performance or other desired properties of the ply. Each ply may include, one layer, two layers, three layers, four layers, five layers, six layers, seven layers, eight layers, nine layers, ten layers, and so on.

The exterior ply, the interior ply, and the at least one optional intermediate ply may be produced via a coextrusion or lamination. The terms "coextruded", "coextrude", or "coextrusion", as used herein, refer to the process of extruding two or more polymer materials through a single die with two or more orifices arranged so that the extrudates merge and weld together into a laminar structure before chilling (i.e., quenching). Examples of coextrusion methods known in the art include, but are not limited to blown film coextrusion, slot cast coextrusion and extrusion coating. The flat die or slot cast process include extruding polymer streams through a flat or slot die onto a chilled roll and subsequently winding the film onto a core to form a roll of film for further processing.

The term "blown film", as used herein, refers to a film produced by the blown coextrusion process. In the blown coextrusion process, streams of melt-plastified polymers are forced through an annular die having a central mandrel to form a tubular extrudate. The tubular extrudate may be expanded to a desired wall thickness by a volume of fluid (e.g., air or other gas) entering the hollow interior of the extrudate via the mandrel and then rapidly cooled or quenched by any of various methods known in the art.

The layers of the exterior ply, the interior ply, and the at least one optional intermediate ply, if multilayer, may alternatively be attached to each other through various laminating methods as known in the art to form a laminated film. The term "attached", as used herein, refers to adhering two surfaces to one another, such as the planar surfaces of two film layers. The laminating methods include, but are not limited to, thermal lamination, adhesive lamination, extrusion lamination, and extrusion coating. The layers may be joined by a laminating agent. In an embodiment, the laminating agent may be an extrusion laminating agent where the parameters for such lamination are expected to be set by one skilled in the art without undue experimentation. Further, the laminating agent can be any material and can be added by any known process.

Before describing several exemplary embodiments of the disclosure, it is to be understood that the disclosure is not limited to the details of construction or process steps set forth in the following description. The disclosure is capable of other embodiments and of being practiced or being carried out in various ways.

Figure 2:
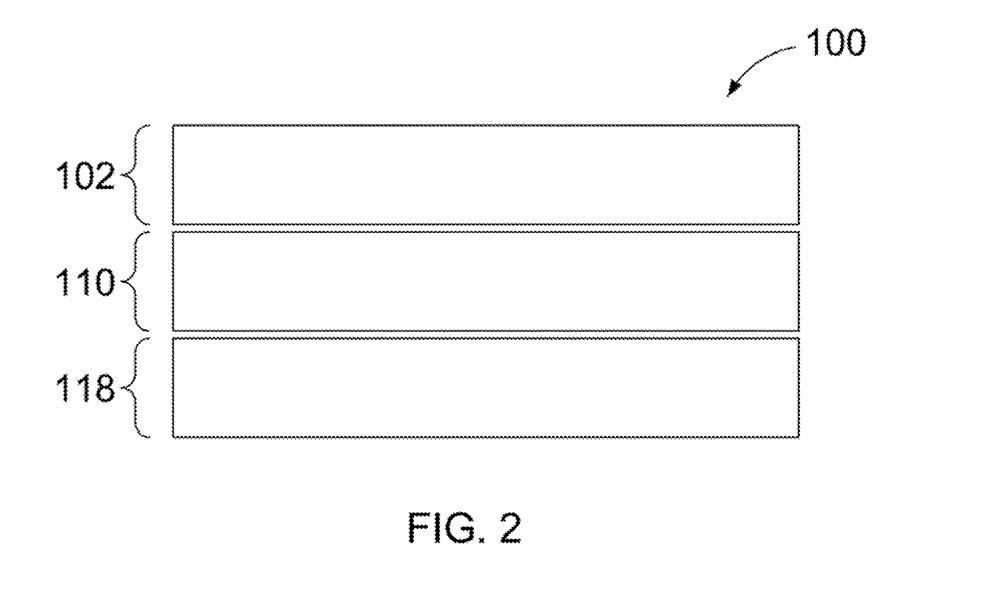
FIG. 2 illustrates a cross-section view of one embodiment of a liner sidewall.
Figure 3:
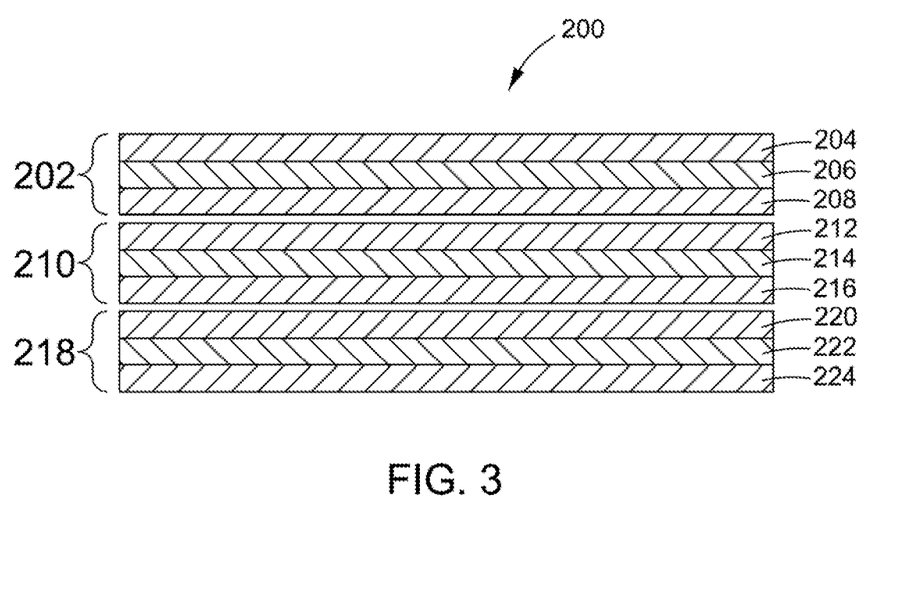
FIG. 3 illustrates a cross-section view of a second embodiment of a liner sidewall.
Figure 4:
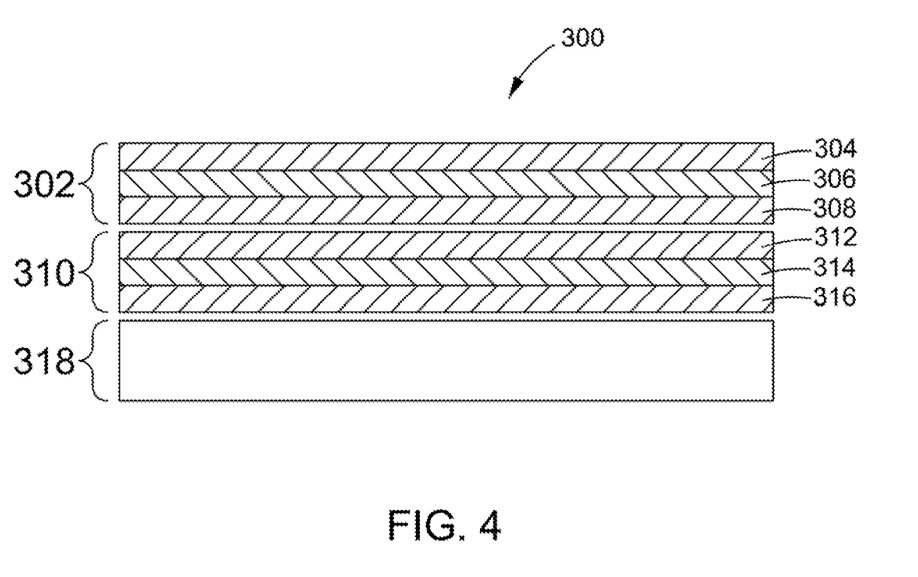
FIG. 4 illustrates a cross-section view of a third embodiment of a liner sidewall.

With reference to FIGS. 2-4, schematic cross-section views of exemplary sidewalls of different liner 10 embodiments are shown. FIG. 2 illustrates a first sidewall 100 that includes an exterior ply 102, an interior ply 118, and at least one optional intermediate ply 110. In an embodiment, at least one of the plies, the exterior ply 102, the interior ply 118, or the at least one optional intermediate ply 110 includes a first polyolefin-silicone copolymer. The exterior ply 102, the interior ply 118 and the at least one optional intermediate ply 110 are shown as monolayer film plies. In other embodiments, the exterior ply, the interior ply and the at least one optional intermediate ply may be multilayer film plies.

The term "polyolefin-silicone copolymer", as used herein, refers to a copolymer comprising polyolefin and silicone. The term "polyolefin", as used herein, refers to homopolymers or copolymers, including, for example, bipolyomers, terpolymers, etc., having a methylene linkage between monomer units which may be formed by any method known to those skill in the art. Non-limiting examples of polyolefins include polyethylene, low density polyethylene, ethylene/propylene copolymers, polypropylene, and propylene/ethylene copolymers. The term "silicone", as used herein, refers to a polymer generally comprising siloxane-based monomer residue repeating units. The term "siloxane", as used herein, refers to a monomer residue repeat unit having the following structure:

where $R^1$ and $R^2$ are independently hydrogen or a hydrocarbyl moiety. The silicone may also comprise branch points such as which is known as a "Q" group in silicone chemistry, or which is known as "T" group in silicone chemistry.

The term "hydrocarbyl", as used herein, refers to a univalent group formed by removing a hydrogen atom from a hydrocarbon (e.g., alkyl groups, such as ethyl, or aryl groups, such as phenyl). In various embodiments, the siloxane monomer residue may be any dialkyl, diaryl, dialkaryl, or diaralkyl siloxane, having the same or differing alkyl, aryl, alkaryl, or aralkyl moieties. In various embodiments, each of $R^1$ and $R^2$ is independently a $C_1$ to $C_{20}$, $C_1$ to $C_{12}$, or $C_1$ to $C_6$ alkyl, aryl, alkaryl, or aralkyl moiety. In various embodiments, $R^1$ and $R^2$ may have the same or a different number of carbon atoms. In various embodiments, the hydrocarbyl group for each of $R^1$ and $R^2$ may be an alkyl group that is saturated and optionally straight-chain. Additionally, the alkyl group in such embodiments may be the same for each of $R^1$ and $R^2$. Non-limiting examples of alkyl groups suitable for use in $R^1$ and $R^2$ include methyl, ethyl, 1-propyl, 2-propyl, 1-butyl, isobutyl, t-butyl, or blends of such materials.

The silicone described herein may have a density from 0.9 g/cm$^3$ to 1.0 g/cm$^3$ or from 0.95 g/cm$^3$ to 0.98 g/cm$^3$. Additionally, the silicone may have a kinematic viscosity at 25 degrees Celsius in the range of from $10 \times 10^6$ to $50 \times 10^6$ centistokes ("cSt"), as determined in accordance with ASTM D445-17a.

While not being bound by theory, it is believed that the polyolefin-silicone copolymer allows the sidewall 12 plies 102, 110 and 118 to shift against each other. Ply shifting may dissipate stress away from the shore line 18 where the liquid product sloshing against the sidewall 12 causes stress on the liner 10. Another contributor to flex-cracking is over-seal that can occur with some sealing processes. Over-seal can create points or areas of stress initiation that can also contribute to flex-cracking. The polyolefin-silicone copolymer may also minimize the effects of stress initiators. The term "over-seal", as used herein, refers to an area of a seal that extends outside of the area of the sealing bar or apparatus that was used to form the seal. The dissipation of the stress may result in reduced flex-cracking and leakage.

A non-limiting example of a polyolefin-silicone copolymer is EXFOLA silicone-based surface modifier, available from Mitsui Chemicals America, Inc., Rye Brook, NY, USA.

The first polyolefin-silicone copolymer may be present in the exterior ply 102, the interior ply 118, and/or the at least one optional intermediate ply 110 in an amount from 0.1 percent to 10.0 percent, specifically from 1.0 percent to 8.0 percent, and more specifically from 2.0 percent to 5.0 percent by weight of the respective ply 102, 110 or 118. In an embodiment, the first polyolefin-silicone copolymer may be present in only one of the plies 102, 110 or 118. In other embodiments, the first polyolefin-silicone copolymer may be present in two of the plies 102, 110 or 118, or may be present in all of the plies 102, 110 and 118. Silicone-based polymers besides polyolefin-silicone copolymers may also be used in any of the plies 102, 110 and 118.

It should be understood that the ply 102, 110 or 118 that includes the first polyolefin-silicone copolymer can further include processing additives or be blended with other materials, such as, but not limited to, polyolefins, pigments, etc. as is known in the art. The terms "processing aids" or "processing additives", as used herein, refer to anti-block agents, slip agents, stabilizing agents, release agents, lubricating agents, anti-oxidants, photo-initiators, primers, colorants, oxygen scavengers, and other additives known to and used by a person of ordinary skill in the art without undue experimentation. The use of processing aids varies depending on the equipment, materials, desired properties, etc. Further, each of the plies 102, 110 or 118 may be opaque, transparent or have varying degrees thereof. For example, any portion of the ply 102, 110 or 118 of the liner 10 may be colorant-free, substantially colorant-free, metal-free, substantially metal-free, or substantially free of an additive or other material that would obscure the passage of light.

When the first polyolefin-silicone copolymer is blended with a polyolefin, the polyolefin may be a first polyethylene. Suitable examples of the first polyethylene may include polyethylene (PE), low density polyethylene (LDPE), linear low density polyethylene (LLDPE), very low density polyethylene (VLDPE), ultra-low density polyethylene (ULDPE), medium density polyethylene (MDPE), high density polyethylene (HDPE), metallocene linear low density polyethylene (mLLDPE), or blends thereof. The first polyethylene may include a density in the range from 0.90 g/cm to 0.96 g/cm$^3$, specifically from 0.91 g/cm$^3$ to 0.94 g/cm$^3$, and more specifically from 0.92 g/cm$^3$ to 0.93 g/cm$^3$. The first polyethylene may be present in an amount from 40 percent to 99.9 percent, specifically from 50 percent to 90 percent, and more specifically from 60 to 80 percent by weight of the respective ply 102, 110 or 118.

In embodiments where the exterior ply 102, the interior ply 118 or the at least one optional intermediate ply 110 is a multilayer film, a barrier material may be included in at least one of the layers. Barrier materials may be required for some embodiments where the liner will be used to package product, such as food, in order to preserve quality of the packaged product through distribution and to extend shelf life. In some instances, a moisture barrier is required to prevent a product from drying out (losing moisture content). In other instances, an oxygen barrier is required to prevent ingress oxygen from degrading a product prematurely. In some embodiments, the exterior ply 102, the interior ply 118 or the at least one optional intermediate ply 110 may include, but is not limited to, polyamide, polyamide blends, ethylene vinyl alcohol copolymer (EVOH), polyvinyl chloride, polyvinylidene chloride, glass, thermoplastic polyurethane (TPU), polyethylene terephthalate copolymer (PET), high density polyethylene (HDPE), polypropylene, and may be blends thereof. The barrier materials may also include metal, such as aluminum foil, metal coated plastic films, aluminum oxide coated films, silicon dioxide coated films, ceramic coated films, or other barrier coatings as is known in the art. The packaging films that are useful as an oxygen barrier in this application are required to have an oxygen transmission rate (OTR) value in the range of 0-0.20 cm$^3$/100 in$^2$ over 24 hours at 80 percent relative humidity (R.H.) and 23 degrees Celsius. Oxygen transmission may be measured according to ASTM D-3985-81. The terms "oxygen transmission rate" or "OTR", as used herein, refer to the amount of oxygen in cubic centimeters (cm$^3$) that will pass through 100 in$^2$ of film in 24 hours at 80 percent R.H and 23 degrees Celsius (or cm$^3$/100 in$^2$ over 24 hours at 80 percent R.H. and 23 degrees Celsius).

The term "polyamide" means a high molecular weight polymer having amide linkages (—CONH—)n which occur along the molecular chain, and includes "nylon" resins which are well known polymers having a multitude of uses including utility as packaging films, bags, and casings. See, e.g., Modern Plastics Encyclopedia, 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food.

The term "nylon", as used herein, refers more specifically to synthetic polyamides, either aliphatic or aromatic, either in crystalline, semi-crystalline, or amorphous form characterized by the presence of the amide group —CONH. It is intended to refer to both polyamides and co-polyamides.

The terms "ethylene vinyl alcohol copolymer" or "EVOH", as used herein, refer to ethylene-vinyl alcohol copolymer. EVOH is otherwise known as saponified or hydrolyzed ethylene-vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably from about 85 to 100 mole percent, and most preferably at least 97 percent. It is well known that to be a highly effective oxygen barrier, the hydrolysis-saponification must be nearly complete, i.e., to the extent of at least 97 percent. EVOH is commercially available in resin form with various percentages of ethylene and there is a direct relationship between ethylene content and melting point. For example, EVOH having a melting point of about 175 degrees Celsius or lower is characteristic of EVOH materials having an ethylene content of about 38 mole percent or higher. EVOH having an ethylene content of 38 mole percent has a melting point of about 175 degrees Celsius. With increasing ethylene content, the melting point is lowered. A melting point of about 158 degrees Celsius corresponds to an ethylene content of 48 mole percent. EVOH copolymers having lower or higher ethylene contents may also be employed. It is expected that processability and orientation would be facilitated at higher ethylene contents; however, gas permeabilities, particularly with respect to oxygen, may become undesirably high for certain packaging applications which are sensitive to microbial growth in the presence of oxygen. Conversely, lower contents may have lower gas permeabilities, but processability and orientation may be more difficult. In some embodiments, ethylene-vinyl alcohol copolymers comprise from 27-44 mole percent, specifically 27-38 mole percent ethylene, or more specifically 27-29 mole percent ethylene.

The terms "polyester" or "PET", as used herein, refer to a homopolymer or copolymer having an ester linkage between monomer units. Polyesters may include a homopolymer or copolymer of alkyl-aromatic esters, including but not limited to polyethylene terephthalate (PET), amorphous polyethylene terephthalate (APET), polyethylene furanoate (PEE), glycol-modified polyethylene terephthalate (PETG), and polybutylene terephthalate (PBT); a copolymer of terephthalate and isophthalate including but not limited to polyethylene terephthalate/isophthalate copolymer, such as isophthalic acid (IPA) (modified polyethylene terephthalate (PETI)); a homopolymer or copolymer of aliphatic esters including but not limited to polylactic acid (PLA), polyglycolic acid (PGA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials.

In some embodiments, a TPU may be added to an EVOH layer. LLDPE or VLDPE layers provide abuse resistance layers to the liner as a whole and can be used on either side of an EVOH layer to provide further protection to that ply. Further, a combination (i.e., LLDPE in one layer and VLDPE in another layer) or mixture (i.e., LLDPE and VLDPE combined in a single layer) of LLDPE and VLDPE can be used. Nylon or polyamide-based layers may be interleaved with other layers as desired to provide further strength and protection to a ply.

It should be understood that tie layers, as generally known by a person of ordinary skill in the art, may be incorporated into the exterior ply 102, the interior ply 118 or the optional intermediate ply 110 as appropriate. The terms "tie layer", "adhesive layer" or "adhesive coating", as used herein, refer to a material placed on one or more layers, partially or entirely, to promote the adhesion of that layer, to another surface. Preferably, adhesive layers or coatings are positioned between two layers of a multilayer film to maintain the two layers in position relative to each other and prevent undesirable delamination. Unless otherwise indicated, a tie layer or an adhesive layer or coating can have any suitable composition that provides a desired level of adhesion with the one or more surfaces in contact with the adhesive layer material.

In an embodiment, with reference to FIG. 3, a first sidewall 200 includes an exterior ply 202 that is a multilayer film, an interior ply 218 that is a multilayer film, and at least one optional intermediate ply 210 that is a multilayer film. The exterior ply 202 includes a first layer 204, a second layer 206, and a third layer 208. In this embodiment, the first layer 204 includes the same material as the third layer 208 and the second layer 206, positioned between the first layer 204 and the third layer 208, includes a different material. The interior ply 218 includes a first layer 220, a second layer 222 and a third layer 224. The first layer 220 includes the same material as the third layer 224 and the second layer 222, positioned between the first layer 220 and the third layer 224, includes a different material. The intermediate ply 210 includes a first layer 212, a second layer 214 and a third layer 216. The first layer 212 includes the same material as the third layer 216 and the second layer 214, positioned between the first layer 212 and the third layer 216, includes a different material.

In an embodiment, the first layer 204 and the third layer 208 of the exterior ply 202 may include a first polyethylene that is a LLDPE and a first polyolefin-silicone copolymer. The second layer 206 of the exterior ply 202 may include an EVOH copolymer. The first layer 220 and the third layer 224 of the interior ply 218 include first polyethylene that is a LLDPE. The second layer 222 of the interior ply 218 may include an EVOH copolymer. The first layer 212 and the third layer 216 of the optional intermediate ply 210 may include a first polyethylene that is a LLDPE and a first polyolefin-silicone copolymer. The second layer 214 of the optional intermediate ply 210 may include an EVOH copolymer.

In another embodiment, with reference to FIG. 4, a first sidewall 300 includes an exterior ply 302 that is a multilayer film, an interior ply 318 that is a monolayer film, and at least one optional intermediate ply 310 that is a multilayer film. The exterior ply 302 includes a first layer 304, a second layer 306, and a third layer 308. In this embodiment, the first layer 304 includes the same material as the third layer 308 and the second layer 306, positioned between the first layer 304 and the third layer 308, includes a different material. The intermediate ply 310 includes a first layer 312, a second layer 314 and a third layer 316. The first layer 312 includes the same material as the third layer 316 and the second layer 314, positioned between the first layer 312 and the third layer 316, includes a different material.

In an embodiment, the first layer 304 and the third layer 308 of the exterior ply 302 may include a first polyethylene that is a LLDPE and a first polyolefin-silicone copolymer. The second layer 306 of the exterior ply 302 may include a polyamide. The interior ply 318 may include a first polyethylene that is a LLDPE. The first layer 312 and the third layer 316 of the optional intermediate ply 310 may include a first polyethylene that is a LLDPE and a first polyolefin-silicone copolymer. The second layer 314 of the optional intermediate ply 310 may include an EVOH copolymer.

In embodiments that include the first polyolefin-silicone copolymer in the first sidewall 100, 200 or 300, the liner 10 may have a flex-crack failure time of greater than 125 minutes, 135 minutes, 145 minutes, 155 minutes, 165 minutes, 175 minutes, or greater. When dunnage is used, the flex-crack failure time may be greater than the flex-crack failure time without the use of dunnage.

Flex-crack failure time is a measure of the time it takes for a liner to experience leakage due to flex-cracking of the sidewall material. A shaker table test is used to simulate transit conditions of a liner when filled with product. The shaker table test is conducted according to ASTM D 999-08, Method A2, Repetitive Shock Test (Rotary Motion). An appropriate shaker table model includes Model V6000, available from LAB. Equipment, Inc., Itasca, IL, USA. An IBC that can hold a 300-gallon liner, is made of plywood, and that has dimensions of 41.25 inches by 45 inches by 38.25 inches (104.78 cm by 114.30 cm by 97.15 cm) is used. The IBC is available from Johnston Trading, Woodland, CA, USA. The 300 gallon liner and the IBC are weighed. The liner is placed into the SBC. Liners that include fitments are placed with the fitment being positioned at the top of the SBC. The liner is filled with water to a water weight of 1,089 kg (2,400 lb). The liner is closed either with a fitment or seal depending on the type of liner) and any moisture is wiped from the exterior of the liner. For samples that include dunnage, a smooth surface, open cell foam (compressible) that is 41.25 inches by 45 inches by 1 inch (2.54 cm) is placed on top of the liner in the IBC. Also for samples that include dunnage, the weight of the liner, the IBC and the dunnage are taken. The IBC lid Is secured. The IBC is then placed onto the shaker table. The table is run at a frequency that provides 190 revolutions per minute (rpm). The IBC is inspected at periodic intervals until liner leakage is detected. The flex-crack failure time is the time at which leakage occurs. The results of the tests for each sample of the same liner tested under the same conditions are averaged. The average time is reported as the flex-crack failure time for that set of samples.

The sidewall 100, 200, and 300 may include a first LLDPE. In some embodiments, the interior ply 118, 218 and 318 may include a first LLDPE. Other embodiments may include a first LLDPE in the at least one optional intermediate ply 110, 210 and 310 and/or the exterior ply 102, 202 and 302. In yet other embodiments, a first LLDPE may be included in the interior ply 118, 218 and 318, the at least one optional intermediate ply 110, 210 and 310 and/or the exterior ply 102, 202 and 302. The first LLDPE may have a density in a range 0.90 to 0.93 g/cm$^3$ and a melt index in a range from 0.2 g/10 minutes to 3.5 g/10 minutes. The first LLDPE may be present in any ply 102, 110, 118, 202, 210, 218, 302, 310, and 318 in an amount from 50 percent to 100 percent, specifically from 60 percent to 90 percent, and more specifically from 70 percent to 80 percent of the respective ply 102, 110, 118, 202, 210, 218, 302, 310, and 318.

Exemplary first LLDPEs include those under the SUPEER tradename available from Sabic United States of America, Houston, TX, USA, and those under the EXCEED XP tradename, available from ExxonMobil, Parkway Spring, TX, USA.

Figure 5:
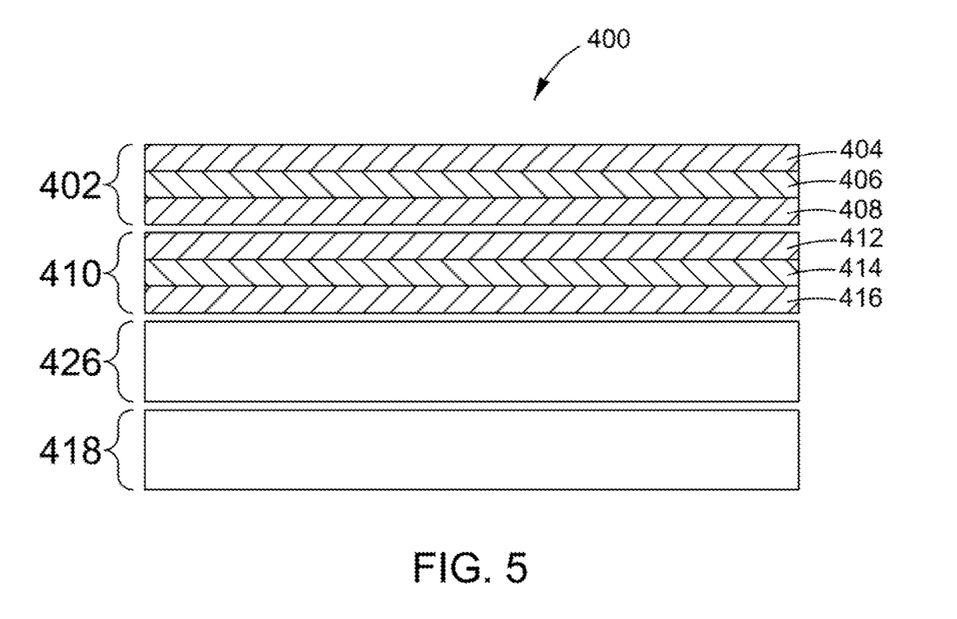
FIG. 5 illustrates a cross-section view of a fourth embodiment of a liner sidewall.

In an embodiment, with reference to FIG. 5, a first sidewall 400 includes an exterior ply 402 that is a multilayer film, an interior ply 418 that is a monolayer film, a first optional intermediate ply 410 that is a multilayer film, and a second optional intermediate ply 426 that is a monolayer film. The exterior ply 402 includes a first layer 404, a second layer 406, and a third layer 408. In this embodiment, the first layer 404 includes the same material as the third layer 408 and the second layer 406, positioned between the first layer 404 and the third layer 408, includes a different material. The first optional intermediate ply 410 includes a first layer 412, a second layer 414 and a third layer 416. The first layer 412 includes the same material as the third layer 416 and the second layer 414, positioned between the first layer 412 and the third layer 416, includes a different material.

In an embodiment, the first layer 404 and the third layer 408 of the exterior ply 402 may include a first LLDPE and a first polyolefin-silicone copolymer. The second layer 406 of the exterior ply 402 may include a polyamide. The interior ply 418 may include a first LLDPE. The first layer 412 and the third layer 416 of the first optional intermediate ply 410 may include a first LLDPE and a first polyolefin-silicone copolymer. The second layer 414 of the optional intermediate ply 410 may include an EVOH copolymer. The second optional intermediate ply 426 may include a first LLDPE.

Figure 6:
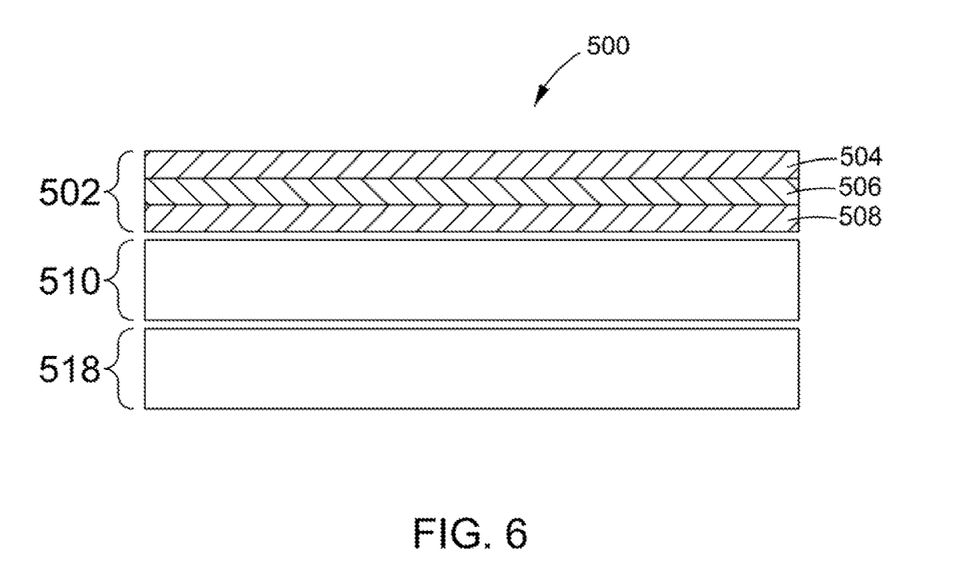
FIG. 6 illustrates a cross-section view of a fifth embodiment of a liner sidewall.

In an embodiment, with reference to FIG. 6, a first sidewall 500 includes an exterior ply 502 that is a multilayer film, an interior ply 518 that is a monolayer film, and an optional intermediate ply 510 that is a monolayer film. The exterior ply 502 includes a first layer 504, a second layer 506, and a third layer 508. In this embodiment, the first layer 504 includes the same material as the third layer 508 and the second layer 506, positioned between the first layer 504 and the third layer 508, includes a different material.

In an embodiment, the first layer 504 and the third layer 508 of the exterior ply 502 may include a first LLDPE. The second layer 506 of the exterior ply 502 may include a metallized polyester. The interior ply 518 and the optional intermediate play 510 may include a first LLDPE.

In embodiments that include a first LLDPE and a first polyolefin-silicone copolymer in the first sidewall, the liner 10 may have a flex-crack failure time of greater than 125 minutes, 135 minutes, 145 minutes, 155 minutes, 165 minutes, 175 minutes, 185 minutes, 195 minutes, 205 minutes, 215 minutes, 225 minutes, 235 minutes, or greater without the use of dunnage. When dunnage is used, the flex-crack failure time may be greater than the flex-crack failure time without the use of dunnage.

In various embodiments, the liner 10 first sidewall 100, 200, 300, 400, and 500 may include as many plies as necessary to achieve the desired performance. The plies may be monolayer film or multilayer film. In embodiments that include multilayer film plies, the ply may include as many layers as necessary.

Figure 7:
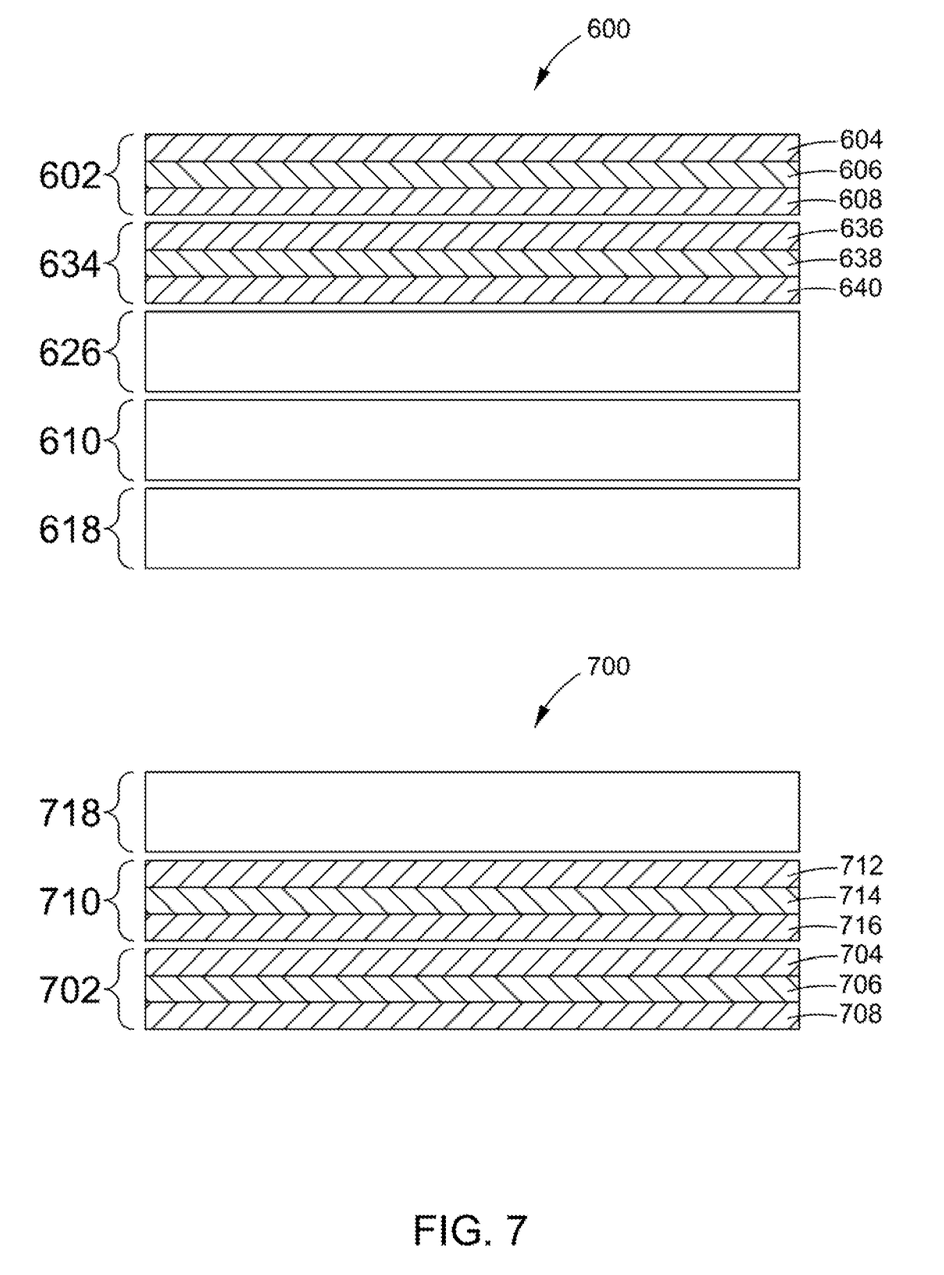
FIG. 7 illustrates a cross-section view of an embodiment of a liner first sidewall and a liner second sidewall.

With reference to FIG. 7, in an embodiment, the liner 10 may include a first sidewall 600 and a second sidewall 700. The first sidewall 600 of the embodiments that include a second sidewall 700 may include any of the embodiments previously described for the first sidewall 100, 200, 300, 400, and 500. The second sidewall 700 includes at least an exterior ply 702 and an interior ply 718. The second sidewall 700 may optionally include at least one optional second sidewall intermediate ply 710 that is positioned between the second sidewall exterior ply 702 and the second sidewall interior ply 718. The second sidewall 700 includes a second polyolefin-silicone copolymer. The second polyolefin-silicone copolymer may include any of the polyolefin-silicone copolymers suitable for use as the first polyolefin-silicone copolymer as previously described herein. The second polyolefin-silicone copolymer may be present in the exterior ply 702, the interior ply 718, and/or the at least one optional intermediate ply 710 in an amount from 0.1 percent to 10.0 percent by weight of the respective ply 702, 710 and 718. In other embodiments, the second polyolefin-silicone copolymer may be present in the respective ply 702, 710 and 718 in an amount from 1.0 percent to 8.0 percent and more specifically from 2.0 percent to 5.0 percent by weight of the respective ply 702, 710 and 718. In an embodiment, the second polyolefin-silicone copolymer may be present in only one of the plies 702, 710 or 718. In other embodiments, the first polyolefin-silicone copolymer may be present in two of the plies 702, 710 or 718, or may be present in all the plies 702, 710 and 718.

The second sidewall 700 may further include a second LLDPE. The second LLDPE may include any of the LLDPEs suitable for use as the first LLDPE as previously described herein. The second LLDPE may be present in the interior ply 718, and/or the exterior ply 702, and/or the intermediate ply 710 in an amount from 50 percent to 100 percent, from 60 percent to 90 percent, from 70 percent to 80 percent, of the respective ply 702, 710 and 718.

The individual plies of the second sidewall 700 may be monolayer film or multilayer film. In embodiments where a ply includes a multilayer film, the multilayer film may include as many layers as necessary for desired properties. The plies may include the materials and configurations that were disclosed for the first sidewall 100, 200, 300, 400, 500 and 600.

The adhesion between the plies of either the first sidewall 100, 200, 300, 400, 500 and 600 or the second sidewall 700 may be from 0 g/2.54 cm to 50 g/2.54 cm (0 g/in to 50 g/in). The sidewalls 600 and 700 are sealed to form the liner 10 that includes an inner compartment and the liner may have at least one fitment 16. The liner 10 can be placed in a bulk container.

In an embodiment, the first sidewall and the second sidewall may include the same number of plies. In another embodiment, the first sidewall may include a greater number of plies than the second sidewall. In yet another embodiment, the first sidewall may include a fewer number of plies than the second sidewall.

In the embodiment of FIG. 7, a first sidewall 600 and a second sidewall 700 are shown. The first sidewall 600 includes an exterior ply 602 that is a multilayer film, a first optional intermediate ply 610 that is a monolayer film, a second optional intermediate ply 626 that is a monolayer film, a third optional intermediate ply 634 that is a multilayer film, and an interior ply 618 that is a monolayer film. The exterior ply 602 includes a first layer 604, a second layer 606, and a third layer 608. In this embodiment, the first layer 604 includes the same material as the third layer 608 and the second layer 606, positioned between the first layer 604 and the third layer 608, includes a different material. The third optional intermediate ply 634 includes a first layer 636, a second layer 638 and a third layer 640. The first layer 636 includes the same material as the third layer 640 and the second layer 638, positioned between the first layer 636 and the third layer 640, includes a different material.

The second sidewall 700 includes an exterior ply 702 that is a multilayer film, a first optional intermediate ply 710 that is a multilayer film and an interior ply 718 that is a monolayer film. The first optional intermediate ply 710 includes a first layer 712, a second layer 714, and a third layer 716. In this embodiment, the first layer 712 includes the same material as the third layer 716 and the second layer 714, positioned between the first layer 712 and the third layer 716, includes a different material. The exterior ply 702 includes a first layer 704, a second layer 706 and a third layer 708. The first layer 704 includes the same material as the third layer 708 and the second layer 706, positioned between the first layer 704 and the third layer 708, includes a different material.

The first sidewall 600 and the second sidewall 700 may be sealed near the perimeter to form the liner 10. In this embodiment, the interior ply 618 of the first sidewall 600 and the interior ply 718 of the second sidewall 700 face each other. An inner compartment of the liner 10 is located between the two interior plies 618 and 718.

In embodiments where the liner 10 includes a first sidewall 600 and a second sidewall 700, the first sidewall 600 may include a first polyolefin-silicone copolymer or a first polyolefin-silicone copolymer and a first LLDPE. The second sidewall 700 may include a second polyolefin-silicone copolymer or a first polyolefin-silicone copolymer and a first LLDPE. In these embodiments, the liner 10 may have a flex-crack failure time of greater than 125 minutes. 135 minutes, 145 minutes, 155 minutes, 165 minutes, 175 minutes, 185 minutes, 195 minutes, 205 minutes, 215 minutes, 225 minutes, 235 minutes, or greater without the use of dunnage. When dunnage is used, the flex-crack failure time may be greater than the flex-crack failure time without the use of dunnage.

In any embodiment, the kinetic coefficient of friction (COF) between the various plies should less than 0.20, 0.15, 0.10, 0.05, 0.025, and 0.01, and in any case, greater than 0 when tested at 35 degrees Celsius with a 500 gram sled (according to ASTM D1894). For example, the COF between the various ply pairings, 1) a ply that includes a first or second polyolefin-silicone copolymer and another ply that includes a first or second polyolefin-silicone copolymer, 2) a ply that includes a first or second LLDPE and another ply that includes a first or second LLDPE, 3) a ply that includes a first or second polyolefin-silicone copolymer and another ply that includes a first or second LLDPE, 4) a ply that includes a first or second polyolefin-silicone copolymer and another ply that does not include a first or second polyolefin-silicone copolymer, 5) a ply that includes a first or second polyolefin silicone copolymer and another ply that does not include a first or second LLDPE, 6) a ply that includes a first or second LLDPE and another ply that does not include a first or second polyolefin-silicone copolymer, 7) a ply that includes a first or second LLDPE and another ply that does not include a first or second LLDPE, 3) a ply that includes a first or second polyolefin-silicone copolymer with another ply that includes a first or second LLDPE, 8) a ply that does not include a first or second polyolefin-silicone copolymer and another ply that also does not include a first or second polyolefin-silicone copolymer, 9) a ply that does not include a first or second polyolefin-silicone copolymer and another ply that does not include a first or second LLDPE, and 10) a ply that does not include a first or second LLDPE and another ply that does not include a first or second LLDPE.

In any embodiment that includes a first sidewall or a first sidewall and a second sidewall, the plies may have a thickness in the range of 38 microns to 178 microns (1.5 mil to 7.0 mil), specifically 50 microns to 150 microns (2.0 mil to 6.0 mil), more specifically 60 microns to 120 microns (2.4 mil to 4.7 mil), and further 70 microns to 90 microns (2.7 mil to 4.7 mil). In embodiments where the ply may be a multilayer film, individual layers may have a thickness in the range of 6 microns to 51 microns (0.25 mil to 2.0 mil), specifically 13 microns to 38 microns (0.5 mil to 1.5 mil), and more specifically 20 microns to 25 microns (0.8 mil to 1.0 mil).

In an embodiment, a seal attaches the first sidewall to itself and the seal is located near the perimeter of the first sidewall. In another embodiment, a seal attaches the first sidewall to the second sidewall and the seal is located near the perimeter of the first and second sidewalls. In any embodiment, an inner compartment is located between the sidewalls of the liner. The liner may include a fitment. The liner 10 may package a product contained within the inner compartment and the product may be a liquid product.

EXAMPLES

Various coextruded film plies were configured into sidewalls. Each ply thickness ranged from 50 microns to 114 microns (2 mil to 4.5 mil). The sidewalls were sealed to make 300 gallon liners in the form of a pillow bag. For ease of reference, one sidewall of the liner is being referenced as a top sidewall and the other opposing sidewall is being referenced as a bottom sidewall. A fitment was attached to the top sidewall. The liners were irradiated at a 1.5 MRads dosage as is known by one of skill in the art for sterilization purposes. The liners were tested for flex-crack failure according to the method previously disclosed herein. The flex-crack failure times are included in TABLE 1.

The various ply compositions included:

A=LLDPE/metallized PET/LLDPE

B=LLDPE/polyamide/EVOH/polyamide/LLDPE

C=LLDPE+polyolefin-silicone copolymer/polyamide/EVOH/polyamide/LLDPE+polyolefin-silicone copolymer

D=LLDPE

E=EXCEED XP LLDPE

F=LLDPE/EVOH/LLDPE

TABLE 1*

| Code | Top Sidewall | Bottom Sidewall | Flex-Crack Failure Time (minutes) | Tested with Dunnage |
|---|---|---|---|---|
| Comparative Example 1 | Exterior Ply = A<br>Intermediate Ply (1) = D<br>Interior Ply = D | Exterior Ply = A<br>Intermediate Ply (1) = D<br>Interior Ply = D | 144 | Yes |
| Comparative Example 2 | Exterior Ply = A<br>Intermediate Ply (1) = E<br>Interior Ply = E | Exterior Ply = A<br>Intermediate Ply (1) = E<br>Interior Ply = E | 195 | Yes |
| Comparative Example 3 | Exterior Ply = B<br>Intermediate Ply (1) = B<br>Intermediate Ply (2) = F<br>Interior Ply = D | Exterior Ply = B<br>Intermediate Ply (1) = B<br>Intermediate Ply (2) = F<br>Interior Ply = D | 125 | Yes |
| Example 1 | Exterior Ply = C<br>Intermediate Ply (1) = C<br>Intermediate Ply (2) = F<br>Interior Ply = D | Exterior Ply = C<br>Intermediate Ply (1) = C<br>Intermediate Ply (2) = F<br>Interior Ply = D | 175 | Yes |
| Example 2 | Exterior Ply = C<br>Intermediate Ply (1) = C<br>Intermediate Ply (2) = E<br>Interior Ply = E | Exterior Ply = C<br>Intermediate Ply (1) = C<br>Intermediate Ply (2) = E<br>Interior Ply = E | 165 | No |
| Example 3 | Exterior Ply = C<br>Intermediate Ply (1) = C<br>Intermediate Ply (2) = E<br>Interior Ply = E | Exterior Ply = C<br>Intermediate Ply (1) = C<br>Intermediate Ply (2) = E<br>Interior Ply = E | 155 | No |
| Example 4 | Exterior Ply = C<br>Intermediate Ply (1) = C<br>Intermediate Ply (2) = E<br>Intermediate Ply (3) = E<br>Interior Ply = E | Exterior Ply = C<br>Intermediate Ply (1) = C<br>Interior Ply = E | 225 | No |
| Example 5 | Exterior Ply = C<br>Intermediate Ply (1) = C<br>Intermediate Ply (2) = E<br>Intermediate Ply (3) = E<br>Interior Ply = E | Exterior Ply = C<br>Intermediate Ply (1) = C<br>Interior Ply = E | 240 | No |

*Note:
the plies are listed in order of configuration in the sidewall. For instance, in Example 5, Intermediate Ply (1) is between the Exterior Ply and Intermediate Ply (2), Intermediate Ply (2) is between Intermediate Ply (1) and Intermediate Ply (3), and Intermediate Ply (3) is between Intermediate Ply (2) and the Interior Ply.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

Unless otherwise indicated, all numbers expressing sizes, amounts, ranges, limits, and physical and other properties used in the present application are to be understood as being preceded in all instances by the term "about". Accordingly, unless expressly indicated to the contrary, the numerical parameters set forth in the present application are approximations that can vary depending on the desired properties sought to be obtained by a person of ordinary skill in the art without undue experimentation using the teachings disclosed in the present application.

The description, examples, embodiments, and drawings disclosed are illustrative only and should not be interpreted as limiting. The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Modifications and other embodiments will be apparent to a person of ordinary skill in the packaging arts, and all such modifications and other embodiments are intended and deemed to be within the scope of the present invention.

What is claimed is:

1. A liner for a bulk container, the liner comprising:
   at least one sidewall comprising at least an exterior ply, an interior ply and optionally, at least one intermediate ply; and
   wherein at least one of the plies comprises a first polyolefin-silicone copolymer, wherein the adhesion between the plies of the first sidewall is from 0 g/2.54 cm to 50 g/2.54 cm (0 g/in to 50 g/in), and wherein the liner comprises a flex crack failure time of greater than 125 minutes when measured according to ASTM D 999-08, Method A2, free of dunnage, and with the liner being filled with water having a water weight of 1.089 kg (2,400 lb).

2. The liner of claim 1, wherein the first polyolefin-silicone copolymer is included in the exterior ply.

3. The liner of claim 1, wherein the first polyolefin-silicone copolymer is included in the at least one optional intermediate ply.

4. The liner of claim 1 wherein the first polyolefin-silicone copolymer is included in the interior ply.

5. The liner of claim 1, further comprising a fitment attached to the at least one sidewall.

6. The liner of claim 1, wherein the at least one ply comprising the first polyolefin-silicone copolymer comprises the first polyolefin-silicone copolymer in an amount from 0.1 percent to 10.0 percent by weight of the ply comprising the first polyolefin-silicone copolymer.

7. The liner of claim 1, wherein the at least one ply comprising the first polyolefin-silicone copolymer comprises a first polyethylene comprising low density polyethylene, linear low density polyethylene, very low density polyethylene, ultra-low density polyethylene, medium density polyethylene, high density polyethylene, metallocene linear low density polyethylene or blends thereof.

8. The liner of claim 1, further comprising an oxygen scavenger in the exterior ply, the interior ply or the at least one optional intermediate ply.

9. The liner of claim 1, wherein the exterior ply, the interior ply or the at least one optional intermediate ply are monolayered.

10. The liner of claim 1, wherein the exterior ply, the interior ply or the at least one optional intermediate ply are multilayered.

11. The liner of claim 1, wherein the exterior ply, the interior ply or the at least one optional intermediate ply comprise a multilayered film and wherein at least one layer comprises an oxygen barrier that comprises ethylene vinyl alcohol copolymer or polyamide.

12. The liner of claim 1, further comprising a coefficient of friction between any of the plies that is less than 0.2.

13. The liner of claim 1, wherein the exterior ply, the interior ply or the at least one optional intermediate ply comprise a first linear low density polyethylene.

14. The liner of claim 13, wherein the liner comprises a flex crack failure time of greater than 144 minutes.

15. A liner for a bulk container, the liner comprising:
a first sidewall comprising at least an exterior ply and an interior ply;
a second sidewall comprising at least an exterior ply and an interior ply;
optionally, at least one first sidewall intermediate ply positioned between the first sidewall exterior ply and the interior ply; and
optionally, at least one second sidewall intermediate ply positioned between the second sidewall exterior ply and the interior ply;
wherein the first sidewall exterior ply comprises a first polyolefin-silicone copolymer comprising a first linear low density polyethylene, wherein the second sidewall exterior ply comprises a second polyolefin-silicone copolymer comprising a second linear low density polyethylene, wherein the adhesion between the plies of each the first sidewall and the second sidewall is from 0 g/2.54 cm to 50 g/2.54 cm (0 g/in to 50 g/in), and wherein the liner comprises a flex crack failure time of greater than 125 minutes when measured according to ASTM D 999-08, Method A2, free of dunnage, and with the liner being filled with water having a water weight of 1,089 kg (2,400 lb).

16. The liner of claim 15, wherein the first sidewall exterior ply or the at least one optional first sidewall intermediate ply comprise the first polyolefin-silicone copolymer and the second sidewall exterior ply or the at least one optional second sidewall intermediate ply comprise the second polyolefin-silicone copolymer in an amount of 0.1 percent to 10.0 percent by weight of each of the respective plies that comprise the first polyolefin-silicone copolymer or the second polyolefin-silicone copolymer.

* * * * *